US011734316B2

(12) United States Patent
Parry et al.

(10) Patent No.: US 11,734,316 B2
(45) Date of Patent: Aug. 22, 2023

(54) RELATIONSHIP-BASED SEARCH IN A COMPUTING ENVIRONMENT

(71) Applicant: vArmour Networks, Inc., Los Altos, CA (US)

(72) Inventors: Jason Parry, San Francisco, CA (US); Liza Detrick, Portland, OR (US); David Lin, Seattle, WA (US); Colin Ross, Arlington, TX (US)

(73) Assignee: vArmour Networks, Inc., Los Altos, CA (US)

( * ) Notice: Subject to any disclaimer, the term of this patent is extended or adjusted under 35 U.S.C. 154(b) by 0 days.

(21) Appl. No.: 17/370,686

(22) Filed: Jul. 8, 2021

(65) Prior Publication Data

US 2023/0011588 A1     Jan. 12, 2023

(51) Int. Cl.
*G06F 16/28*       (2019.01)
*G06F 16/248*     (2019.01)
(Continued)

(52) U.S. Cl.
CPC .......... *G06F 16/288* (2019.01); *G06F 16/248* (2019.01); *G06F 16/24573* (2019.01);
(Continued)

(58) Field of Classification Search
CPC ............. G06F 16/288; G06F 16/24573; G06F 16/287; G06F 16/26; G06F 16/24575; G06F 16/248
(Continued)

(56) References Cited

U.S. PATENT DOCUMENTS 6,253,321 B1   6/2001   Nikander et al.
6,484,261 B1   11/2002   Wiegel
(Continued)

FOREIGN PATENT DOCUMENTS

TW    201642616 A    12/2016
TW    201642617 A    12/2016
(Continued)

OTHER PUBLICATIONS

"International Search Report" and "Written Opinion of the International Searching Authority," Patent Cooperation Treaty Application No. PCT/US2016/024116, dated May 3, 2016, 12 pages.
(Continued)

*Primary Examiner* — Joshua Bullock
(74) *Attorney, Agent, or Firm* — Carr & Ferrell LLP (57) ABSTRACT

Systems and methods for a relationship-based search in a computing environment are provided. An example method includes providing a graph database. The graph database includes nodes representing workloads of the computing environment and edges representing relationships between the nodes. The method also includes enriching the graph database by associating the nodes with metadata associated with the nodes and the relationships. The method also includes receiving a user query including data associated with at least one of the metadata and the relationships. The method also includes determining, based on the user query, a subset of the nodes in the graph database and a subset of relationships between the nodes in the subset of the nodes. The method also includes displaying, via a graphical user interface, a graphical representation of the subset of the nodes and relationships between the nodes in the subset of the nodes.

18 Claims, 7 Drawing Sheets

(51) Int. Cl.
*G06F 16/2457* (2019.01)
*G06F 16/26* (2019.01)

(52) U.S. Cl.
CPC ........ *G06F 16/24575* (2019.01); *G06F 16/26* (2019.01); *G06F 16/287* (2019.01)

(58) Field of Classification Search
USPC ........................................................ 707/737
See application file for complete search history.

(56) References Cited

U.S. PATENT DOCUMENTS

| | | |
|---|---|---|
| 6,578,076 B1 | 6/2003 | Putzolu |
| 6,765,864 B1 | 7/2004 | Natarajan et al. |
| 6,970,459 B1 | 11/2005 | Meier |
| 6,981,155 B1 | 12/2005 | Lyle et al. |
| 7,058,712 B1 | 6/2006 | Vasko et al. |
| 7,062,566 B2 | 6/2006 | Amara et al. |
| 7,096,260 B1 | 8/2006 | Zavalkovsky et al. |
| 7,373,524 B2 | 5/2008 | Motsinger et al. |
| 7,397,794 B1 | 7/2008 | Lacroute et al. |
| 7,467,408 B1 | 12/2008 | O'Toole, Jr. |
| 7,475,424 B2 | 1/2009 | Lingafelt et al. |
| 7,516,476 B1 | 4/2009 | Kraemer et al. |
| 7,519,062 B1 | 4/2009 | Kloth et al. |
| 7,627,671 B1 | 12/2009 | Palma |
| 7,694,181 B2 | 4/2010 | Noller et al. |
| 7,725,937 B1 | 5/2010 | Levy |
| 7,742,414 B1 | 6/2010 | Iannaccone et al. |
| 7,774,837 B2 | 8/2010 | McAlister |
| 7,849,495 B1 | 12/2010 | Huang et al. |
| 7,900,240 B2 | 3/2011 | Terzis et al. |
| 7,904,454 B2 | 3/2011 | Raab |
| 7,996,255 B1 | 8/2011 | Shenoy et al. |
| 8,051,460 B2 | 11/2011 | Lum et al. |
| 8,112,304 B2 | 2/2012 | Scates |
| 8,254,381 B2 | 8/2012 | Allen et al. |
| 8,259,571 B1 | 9/2012 | Raphel et al. |
| 8,291,495 B1 | 10/2012 | Burns et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,429,647 B2 | 4/2013 | Zhou |
| 8,468,113 B2 | 6/2013 | Harrison et al. |
| 8,490,153 B2 | 7/2013 | Bassett et al. |
| 8,494,000 B1 | 7/2013 | Nadkarni et al. |
| 8,499,330 B1 | 7/2013 | Albisu et al. |
| 8,528,091 B2 | 9/2013 | Bowen et al. |
| 8,539,548 B1 | 9/2013 | Overby, Jr. et al. |
| 8,565,118 B2 | 10/2013 | Shukla et al. |
| 8,612,744 B2 | 12/2013 | Shieh |
| 8,661,434 B1 | 2/2014 | Liang et al. |
| 8,677,496 B2 | 3/2014 | Wool |
| 8,688,491 B1 | 4/2014 | Shenoy et al. |
| 8,726,343 B1 | 5/2014 | Borzycki et al. |
| 8,730,963 B1 | 5/2014 | Grosser, Jr. et al. |
| 8,798,055 B1 | 8/2014 | An |
| 8,813,169 B2 | 8/2014 | Shieh |
| 8,813,236 B1 | 8/2014 | Saha et al. |
| 8,819,762 B2 | 8/2014 | Harrison et al. |
| 8,898,788 B1 | 11/2014 | Aziz et al. |
| 8,935,457 B2 | 1/2015 | Feng et al. |
| 8,938,782 B2 | 1/2015 | Sawhney et al. |
| 8,990,371 B2 | 3/2015 | Kalyanaraman et al. |
| 9,009,829 B2 | 4/2015 | Stolfo et al. |
| 9,015,299 B1 | 4/2015 | Shah |
| 9,021,546 B1 | 4/2015 | Banerjee |
| 9,027,077 B1 | 5/2015 | Bharali et al. |
| 9,036,639 B2 | 5/2015 | Zhang |
| 9,060,025 B2 | 6/2015 | Xu |
| 9,141,625 B1 | 9/2015 | Thornewell et al. |
| 9,191,327 B2 | 11/2015 | Shieh et al. |
| 9,258,275 B2 | 2/2016 | Sun et al. |
| 9,294,302 B2 | 3/2016 | Sun et al. |
| 9,294,442 B1 | 3/2016 | Lian et al. |
| 9,361,089 B2 | 6/2016 | Bradfield et al. |
| 9,380,027 B1 | 6/2016 | Lian et al. |
| 9,405,665 B1 | 8/2016 | Shashi et al. |
| 9,407,602 B2 | 8/2016 | Feghali et al. |
| 9,521,115 B1 | 12/2016 | Woolward |
| 9,609,083 B2 | 3/2017 | Shieh |
| 9,621,595 B2 | 4/2017 | Lian et al. |
| 9,680,852 B1 | 6/2017 | Wager et al. |
| 9,762,599 B2 | 9/2017 | Wager et al. |
| 9,794,289 B1 | 10/2017 | Banerjee et al. |
| 9,973,472 B2 | 5/2018 | Woolward et al. |
| 10,009,317 B2 | 6/2018 | Woolward |
| 10,009,381 B2 | 6/2018 | Lian et al. |
| 10,091,238 B2 | 10/2018 | Shieh et al. |
| 10,116,441 B1 | 10/2018 | Rubin et al. |
| 10,191,758 B2 | 1/2019 | Ross et al. |
| 10,193,929 B2 | 1/2019 | Shieh et al. |
| 10,264,025 B2 | 4/2019 | Woolward |
| 10,333,827 B2 | 6/2019 | Xu et al. |
| 10,333,986 B2 | 6/2019 | Lian et al. |
| 10,382,467 B2 | 8/2019 | Wager et al. |
| 10,528,897 B2 | 1/2020 | Labat et al. |
| 10,630,703 B1 | 4/2020 | Ghosh et al. |
| 10,755,334 B2 | 8/2020 | Eades et al. |
| 10,862,748 B1 | 12/2020 | Deruijter |
| 11,194,815 B1 * | 12/2021 | Kumar .............. G06F 16/24532 |
| 11,290,493 B2 | 3/2022 | Woolward et al. |
| 11,290,494 B2 | 3/2022 | Li et al. |
| 11,310,284 B2 * | 4/2022 | Woolward .......... H04L 63/0263 |
| 2002/0031103 A1 | 3/2002 | Wiedeman et al. |
| 2002/0066034 A1 | 5/2002 | Schlossberg et al. |
| 2003/0055950 A1 | 3/2003 | Cranor et al. |
| 2003/0177389 A1 | 9/2003 | Albert et al. |
| 2004/0062204 A1 | 4/2004 | Bearden et al. |
| 2004/0095897 A1 | 5/2004 | Vafaei |
| 2004/0172557 A1 | 9/2004 | Nakae et al. |
| 2005/0021943 A1 | 1/2005 | Ikudome et al. |
| 2005/0033989 A1 | 2/2005 | Poletto et al. |
| 2005/0114829 A1 | 5/2005 | Robin et al. |
| 2005/0154576 A1 | 7/2005 | Tarui |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0005228 A1 | 1/2006 | Matsuda |
| 2006/0037077 A1 | 2/2006 | Gadde et al. |
| 2006/0050696 A1 | 3/2006 | Shah et al. |
| 2007/0016945 A1 | 1/2007 | Bassett et al. |
| 2007/0019621 A1 | 1/2007 | Perry et al. |
| 2007/0022090 A1 | 1/2007 | Graham |
| 2007/0064617 A1 | 3/2007 | Reves |
| 2007/0079308 A1 | 4/2007 | Chiaramonte et al. |
| 2007/0130566 A1 | 6/2007 | Van Rietschote |
| 2007/0157286 A1 | 7/2007 | Singh et al. |
| 2007/0162400 A1 | 7/2007 | Brew et al. |
| 2007/0168971 A1 | 7/2007 | Royzen et al. |
| 2007/0192861 A1 | 8/2007 | Varghese et al. |
| 2007/0192863 A1 | 8/2007 | Kapoor et al. |
| 2007/0198656 A1 | 8/2007 | Mazzaferri et al. |
| 2007/0239987 A1 | 10/2007 | Hoole et al. |
| 2007/0271612 A1 | 11/2007 | Fang et al. |
| 2007/0277222 A1 | 11/2007 | Pouliot |
| 2008/0016339 A1 | 1/2008 | Shukla |
| 2008/0016550 A1 | 1/2008 | McAlister |
| 2008/0083011 A1 | 4/2008 | McAlister et al. |
| 2008/0155239 A1 | 6/2008 | Chowdhury et al. |
| 2008/0163207 A1 | 7/2008 | Reumann et al. |
| 2008/0195670 A1 | 8/2008 | Boydstun |
| 2008/0229382 A1 | 9/2008 | Vitalos |
| 2008/0239961 A1 | 10/2008 | Hilerio et al. |
| 2008/0301770 A1 | 12/2008 | Kinder |
| 2008/0307110 A1 | 12/2008 | Wainner et al. |
| 2009/0077621 A1 | 3/2009 | Lang et al. |
| 2009/0077666 A1 | 3/2009 | Chen et al. |
| 2009/0083445 A1 | 3/2009 | Ganga |
| 2009/0138316 A1 | 5/2009 | Weller et al. |

(56) References Cited

U.S. PATENT DOCUMENTS

| | | |
|---|---|---|
| 2009/0165078 A1 | 6/2009 | Samudrala et al. |
| 2009/0190585 A1 | 7/2009 | Allen et al. |
| 2009/0249470 A1 | 10/2009 | Litvin et al. |
| 2009/0260051 A1 | 10/2009 | Igakura |
| 2009/0268667 A1 | 10/2009 | Gandham et al. |
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0088738 A1 | 4/2010 | Birnbach |
| 2010/0095367 A1 | 4/2010 | Narayanaswamy |
| 2010/0191863 A1 | 7/2010 | Wing |
| 2010/0192223 A1 | 7/2010 | Ismael et al. |
| 2010/0192225 A1 | 7/2010 | Ma et al. |
| 2010/0199349 A1 | 8/2010 | Ellis |
| 2010/0208699 A1 | 8/2010 | Lee et al. |
| 2010/0228962 A1 | 9/2010 | Simon et al. |
| 2010/0235880 A1 | 9/2010 | Chen et al. |
| 2010/0274970 A1 | 10/2010 | Treuhaft et al. |
| 2010/0281539 A1 | 11/2010 | Burns et al. |
| 2010/0287544 A1 | 11/2010 | Bradfield et al. |
| 2010/0333165 A1 | 12/2010 | Basak et al. |
| 2011/0003580 A1 | 1/2011 | Belrose et al. |
| 2011/0022812 A1 | 1/2011 | van der Linden et al. |
| 2011/0069710 A1 | 3/2011 | Naven et al. |
| 2011/0072486 A1 | 3/2011 | Hadar et al. |
| 2011/0090915 A1 | 4/2011 | Droux et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riiey et al. |
| 2012/0017258 A1 | 1/2012 | Suzuki |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0216273 A1 | 8/2012 | Rolette et al. |
| 2012/0278903 A1 | 11/2012 | Pugh |
| 2012/0284792 A1 | 11/2012 | Liem |
| 2012/0297383 A1 | 11/2012 | Meisner et al. |
| 2012/0311144 A1 | 12/2012 | Akelbein et al. |
| 2012/0311575 A1 | 12/2012 | Song |
| 2012/0324567 A1 | 12/2012 | Couto et al. |
| 2013/0019277 A1 | 1/2013 | Chang et al. |
| 2013/0054536 A1 | 2/2013 | Sengupta |
| 2013/0081142 A1 | 3/2013 | McDougal et al. |
| 2013/0086399 A1 | 4/2013 | Tychon et al. |
| 2013/0097138 A1 * | 4/2013 | Barkol .............. G06F 16/24544 707/706 |
| 2013/0097692 A1 | 4/2013 | Cooper et al. |
| 2013/0145465 A1 | 6/2013 | Wang et al. |
| 2013/0151680 A1 | 6/2013 | Salinas et al. |
| 2013/0166490 A1 | 6/2013 | Elkins et al. |
| 2013/0166720 A1 | 6/2013 | Takashima et al. |
| 2013/0198799 A1 | 8/2013 | Staggs et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0283336 A1 | 10/2013 | Macy et al. |
| 2013/0291088 A1 | 10/2013 | Shieh et al. |
| 2013/0298181 A1 | 11/2013 | Smith et al. |
| 2013/0298184 A1 | 11/2013 | Ermagan et al. |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0033267 A1 * | 1/2014 | Aciicmez .............. H04L 63/20 726/1 |
| 2014/0096229 A1 | 4/2014 | Burns et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0310765 A1 | 10/2014 | Stuntebeck et al. |
| 2014/0337743 A1 | 11/2014 | Branton |
| 2014/0344435 A1 | 11/2014 | Mortimore, Jr. et al. |
| 2015/0047046 A1 | 2/2015 | Pavlyushchik |
| 2015/0058983 A1 | 2/2015 | Zeitlin et al. |
| 2015/0082417 A1 | 3/2015 | Bhagwat et al. |
| 2015/0124606 A1 | 5/2015 | Alvarez et al. |
| 2015/0163088 A1 | 6/2015 | Anschutz |
| 2015/0180894 A1 | 6/2015 | Sadovsky et al. |
| 2015/0180949 A1 | 6/2015 | Maes |
| 2015/0229641 A1 | 8/2015 | Sun et al. |
| 2015/0235229 A1 | 8/2015 | Pryor |
| 2015/0249676 A1 | 9/2015 | Koyanagi et al. |
| 2015/0269383 A1 * | 9/2015 | Lang .................... G06F 21/604 726/1 |
| 2015/0295943 A1 | 10/2015 | Malachi |
| 2016/0028851 A1 | 1/2016 | Shieh |
| 2016/0162179 A1 | 6/2016 | Annett et al. |
| 2016/0173521 A1 | 6/2016 | Yampolskiy et al. |
| 2016/0191466 A1 | 6/2016 | Pernicha |
| 2016/0191545 A1 | 6/2016 | Nanda et al. |
| 2016/0203331 A1 | 7/2016 | Khan et al. |
| 2016/0234250 A1 * | 8/2016 | Ashley .................. H04L 63/20 |
| 2016/0269442 A1 | 9/2016 | Shieh |
| 2016/0294774 A1 | 10/2016 | Woolward et al. |
| 2016/0294875 A1 | 10/2016 | Lian et al. |
| 2016/0323245 A1 | 11/2016 | Shieh et al. |
| 2016/0337390 A1 | 11/2016 | Sridhara et al. |
| 2016/0350105 A1 * | 12/2016 | Kumar .................... G06F 8/71 |
| 2016/0357424 A1 | 12/2016 | Pang et al. |
| 2017/0005986 A1 | 1/2017 | Bansal et al. |
| 2017/0063795 A1 | 3/2017 | Lian et al. |
| 2017/0085654 A1 | 3/2017 | Mikhailov et al. |
| 2017/0118218 A1 | 4/2017 | Koottayi |
| 2017/0134422 A1 | 5/2017 | Shieh et al. |
| 2017/0168864 A1 | 6/2017 | Ross et al. |
| 2017/0180421 A1 | 6/2017 | Shieh et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0223038 A1 | 8/2017 | Wager et al. |
| 2017/0251013 A1 | 8/2017 | Kirti |
| 2017/0279770 A1 | 9/2017 | Woolward |
| 2017/0302685 A1 * | 10/2017 | Ladnai ................ G06F 16/9024 |
| 2017/0339188 A1 | 11/2017 | Jain et al. |
| 2017/0374032 A1 | 12/2017 | Woolward et al. |
| 2017/0374101 A1 | 12/2017 | Woolward |
| 2018/0005296 A1 | 1/2018 | Eades et al. |
| 2018/0095976 A1 | 4/2018 | Shelksohn |
| 2018/0191779 A1 | 7/2018 | Shieh et al. |
| 2018/0232262 A1 | 8/2018 | Chowdhury et al. |
| 2019/0043534 A1 | 2/2019 | Sievert |
| 2019/0052549 A1 | 2/2019 | Duggal et al. |
| 2019/0081963 A1 | 3/2019 | Waghorn |
| 2019/0141075 A1 | 5/2019 | Gay |
| 2019/0273746 A1 | 9/2019 | Coffing |
| 2019/0278760 A1 | 9/2019 | Smart |
| 2019/0317728 A1 | 10/2019 | Chen et al. |
| 2019/0342307 A1 | 11/2019 | Gamble et al. |
| 2019/0394225 A1 | 12/2019 | Vajipayajula et al. |
| 2020/0043008 A1 | 2/2020 | Hrabik |
| 2020/0065343 A1 | 2/2020 | Morkovine |
| 2020/0074078 A1 | 3/2020 | Saxe et al. |
| 2020/0076826 A1 | 3/2020 | Ford |
| 2020/0145441 A1 | 5/2020 | Patterson et al. |
| 2020/0169565 A1 | 5/2020 | Badawy et al. |
| 2020/0259852 A1 | 8/2020 | Wolff |
| 2020/0382363 A1 | 12/2020 | Woolward et al. |
| 2020/0382556 A1 | 12/2020 | Woolward et al. |
| 2020/0382557 A1 | 12/2020 | Woolward et al. |
| 2020/0382560 A1 | 12/2020 | Woolward et al. |

(56) References Cited

U.S. PATENT DOCUMENTS

| | | | |
|---|---|---|---|
| 2020/0382586 A1 | 12/2020 | Badawy et al. | |
| 2021/0120029 A1 | 4/2021 | Ross et al. | |
| 2021/0168150 A1 | 6/2021 | Ross et al. | |
| 2022/0201024 A1 | 6/2022 | Ross et al. | |
| 2022/0201025 A1 | 6/2022 | Ross et al. | |
| 2022/0311460 A1* | 9/2022 | Azin | H03M 1/462 |

FOREIGN PATENT DOCUMENTS

| | | |
|---|---|---|
| TW | 201642618 A | 12/2016 |
| TW | 201703483 A | 1/2017 |
| TW | 201703485 A | 1/2017 |
| WO | WO2002098100 A1 | 12/2002 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | WO2017100365 A1 | 6/2017 |

OTHER PUBLICATIONS

"International Search Report" and "Written Opinion of the International Searching Authority," Patent Cooperation Treaty Application No. PCT/US2016/024300, dated May 3, 2016, 9 pages.

"International Search Report" and "Written Opinion of the International Searching Authority," Patent Cooperation Treaty Application No. PCT/US2016/024053, dated May 3, 2016, 12 pages.

"International Search Report" and "Written Opinion of the International Searching Authority," Patent Cooperation Treaty Application No. PCT/US2016/019643, dated May 3, 2016, 27 pages.

Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection, 3 pages.

"International Search Report" and "Written Opinion of the International Searching Authority," Patent Cooperation Treaty Application No. PCT/US2016/024310, dated Jun. 20, 2016, 9 pages.

"Feature Handbook: NetBrain® Enterprise Edition 6.1" NetBrain Technologies, Inc., Feb. 25, 2016, 48 pages.

Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.

"International Search Report" and "Written Opinion of the International Searching Authority," Patent Cooperation Treaty Application No. PCT/US2016/065451, dated Jan. 12, 2017, 20 pages.

Maniar, Neeta, "Centralized Tracking and Risk Analysis of 3rd Party Firewall Connections," SANS Institute InfoSec Reading Room, Mar. 11, 2005, 20 pages.

Hu, Hongxin et al., "Detecting and Resolving Firewall Policy Anomalies," IEEE Transactions on Dependable and Secure Computing, vol. 9, No. 3, May/Jun. 2012, pp. 318-331.

Bates, Adam Macneil, "Designing and Leveraging Trustworthy Provenance-Aware Architectures", ProQuest Dissertations and Theses ProQuest Dissertations Publishing, 2017, 147 pages.

Wang et al., "System and Method for Attributing User Behavior from Multiple Technical Telemetry Sources," U.S. Appl. No. 17/162,761, filed Jan. 29, 2021; Specification, Claims, Abstract, and Drawings, 31 pages.

* cited by examiner

RELATIONSHIP-BASED SEARCH IN A COMPUTING ENVIRONMENT

TECHNICAL FIELD

The present disclosure relates generally to data processing and, more particularly, to systems and methods for a relationship-based search in a computing environment.

BACKGROUND

Enterprises use computer networks for providing services, content, and various products. The computer networks can include both low-risk and critical enterprise assets. Because low-risk assets are generally not as secure as critical enterprise assets, they can be more vulnerable to hacker attacks, computer viruses, and malicious software. Thus, attackers can use less secure low-risk assets as points of entrance into the network. Then attackers can move across the network and behind hardware firewalls to penetrate internal networks of the critical enterprise assets. Therefore, the relationships of low-risk and critical assets, and how they chain together, are of the utmost interest to the security practitioner.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for a relationship-based search in a computing environment, such as cloud computing environments, hybrid cloud environments, and modern datacenter environments/private datacenters. According to an example embodiment, a method for a relationship-based search in a computing environment may include providing a graph database. The graph database may include nodes representing users, middleware intersection points, or workloads of the computing environment and edges representing relationships between the nodes. The method may include enriching the graph database by associating the nodes with domain-relevant metadata associated with the nodes or relationships aggregated from various authoritative sources. For example, when a relationship first occurs, a domain can be created for the metadata in order to utilize a query to determine 'what changed' from a specific time/date. The method may include receiving a user query including data associated with at least one of the metadata and the relationships. The method may include determining, based on the user query, a subset of the nodes in the graph database and a subset of relationships between the nodes in the subset of the nodes. The method may include displaying, via a graphical user interface, a graphical representation of the subset of the nodes and relationships between the nodes in the subset of the nodes or producing a machine-readable document (for example, JSON format) of the results of determination of the subset of the nodes and the subset of relationships.

The method may include generating, based on the subset of the nodes and the subset of relationships, a security policy allowing or disallowing at least one relationship between the nodes corresponding to the nodes in the graph database.

Determining the subset of the nodes may include determining nodes corresponding to workloads running an application specified in the user query. Determining the subset of the nodes may also include determining nodes corresponding to nodes delivering or accessing an application specified in the user query.

Determining the subset of the nodes may include determining a chain of consecutively connected nodes. In an example embodiment, the determination of a chain of consecutively connected workloads can be used in a security situation when a first node in the chain is unauthorizedly accessible from the last node in the chain via middle nodes in the chain. In other example embodiments, a chain of consecutively connected workloads that delivers a given service, a chain of consecutively connected workloads with a shared or common property, a chain of consecutively connected workloads related to each other by having conflicting properties (e.g., when a dependent node has a lower threshold for recovery time than a node on which this node depends), or a chain of consecutively connected workloads that communicate with a specific network can be determined.

Determining the subset of the nodes may include determining a chain of consecutively connected nodes. The last node in the chain may have a vulnerability and may be connected to the first node in the chain via a predetermined number of nodes. The predetermined number can be specified in the user query.

Determining the subset of the nodes may include determining nodes with a relationship to nodes running an application specified in the user query and having at least one vulnerability, or having at least one vulnerability exceeding a certain Common Vulnerability Scoring System (CVSS) or Common Vulnerabilities and Exposures (CVE) threshold. In a further example embodiment, the subset of the nodes may include a list of nodes having a CVSS or CVE score higher than a predetermined threshold.

Determining the subset of the nodes may include determining nodes corresponding to nodes connected to a workload specified in the user query and having at least one vulnerability.

According to another embodiment, a system for a relationship-based search in a computing environment is provided. The system may include at least one processor and a memory storing processor-executable code. The processor can be configured to implement the operations of the above-mentioned method for a relationship-based search in a computing environment.

According to yet another aspect of the disclosure, there is provided a non-transitory processor-readable medium, which stores processor-readable instructions. When the processor-readable instructions are executed by a processor, they cause the processor to implement the above-mentioned method for a relationship-based search in a computing environment.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure provides methods and systems for a relationship-based search in a computing environment. The proposed systems facilitate searches of relationships in a graph dataset describing relationships between computer systems, and business functions and services performed by the computer systems. The graph dataset may include metadata associated with a large number of computer systems. The metadata may include information concerning business context (such as business unit owner, business product provided), regulatory context (such as regulatory framework, which is applicable, categorization of risk, last audited), cyber risk operational context (such as recovery time objectives and software vulnerability status), and so forth. In many cases the relationships between the nodes returned in the search results are as important as the list of nodes themselves.

Traditional search systems provide only a list of items satisfying a search query and do not show relationships between the items in the list. Unlike traditional search systems, embodiments of the present disclosure may provide information concerning searching for related entities. Some embodiments of the present disclosure may facilitate visualization of the relationships between the entities of search results.

Certain embodiments of the present disclosure may facilitate searching for devices that have software vulnerabilities and are connected to critical databases. Some embodiments of the present disclosure may provide a search for vulnerable servers that can be attacked and determine direct or indirect paths from the vulnerable servers to a critical asset, and by doing so, provide information on how a potential hacker may traverse through the vulnerable servers to get access to the critical asset.

In some embodiments, the information on a potential path that hackers can exploit can be used to generate a security policy disallowing connection between at least some of the vulnerable servers to prevent potential hacker attacks. In certain embodiments, the information concerning the potential path can be used to determine, based on log files, whether connections between the servers along the potential path have occurred in the past. In other embodiments, the information concerning the potential path can be used to monitor connections between the servers in real time and issue an alert as soon as the connections occur between the servers along the path. In an example embodiment, in the course of the search, potential relationships are considered based on permissions or policies.

Figure 1:
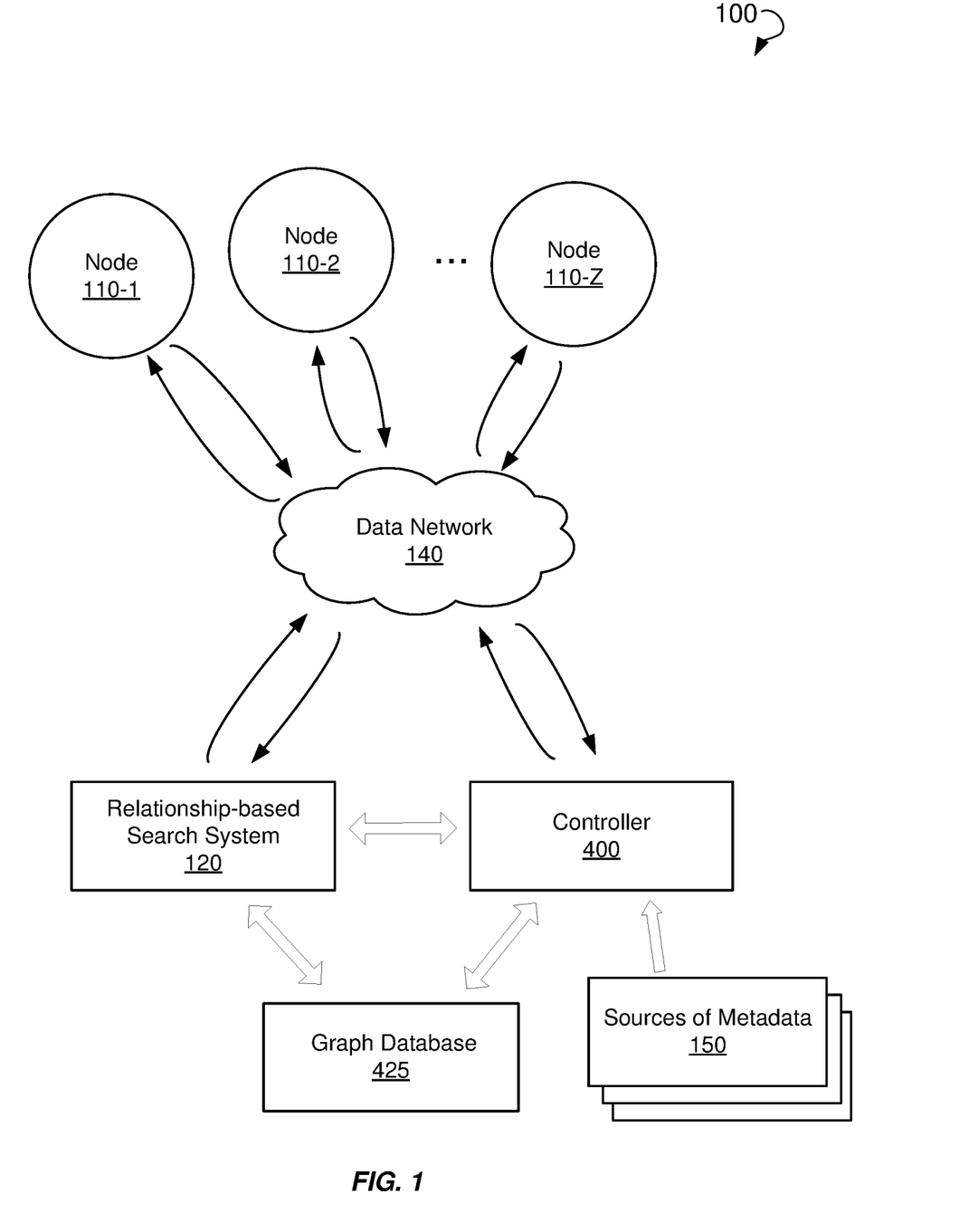
FIG. 1 is a block diagram of an environment, in which systems and methods for a relationship-based search in a computing environment can be implemented, according to some example embodiments.

Referring now to the drawings, FIG. 1 is a block diagram of a computing environment 100, in which systems and methods for a relationship-based search in a computing environment can be implemented, according to some example embodiments. The computing environment 100 may include nodes 110-$i$ ($i=1, \ldots, N$), a relationship-based search system 120, a cloud controller 400, and a graph database 425. The nodes 110-$i$ ($i=1, \ldots, N$) may be associated with one or more servers of enterprises and clients. The nodes 110-$i$ ($i=1, \ldots, N$) can include workloads, users, client devices, user objects, containers, platform as a service (PaaS) Pods (a pod is a basic scheduling unit in Kubernetes and may include containers co-located on the same node), processes, cloud services instances, bare metal servers, cloud service instances, Kubernetes Pods, mobile client devices, Internet of Thing devices, middleware objects such as message queues, user identifiers, application servers, database servers, and client servers, which may communicate with each other via a data network 140. The nodes 110-$i$ ($i=1, \ldots, N$) may further include one or more applications, servlets, and other components and may run on different networked platforms. As used herein, a user may be represented by user account credentials assigned to a human being, a specific role, or a software agent.

The data network 140 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network 140 can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The controller 400 may track connections and relationships between the nodes 110-$i$ (i=1, . . . , N), store the information about nodes 110-$i$ (i=1, . . . , N) and the relationships between the nodes in a graph database 425, and manage security policies in the computing environment 100. The graph database 425 may include nodes and edges. The nodes may represent nodes 110-$i$ (i=1, . . . , N). The edges may represent relationships between the nodes 110-$i$ (i=1, . . . , N). Details of the controller 400 and the graph database 425 are described in connection with FIG. 4.

The relationship-based search system 120 can provide search capability for specific nodes having specific relationships in the graph database 425. To perform the search, the nodes in graph database 425 can be enriched by metadata associated with the nodes 110-$i$ (i=1, . . . , N) corresponding to the nodes and the relationships. The metadata associated with a node of the nodes 110-$i$ (i=1, . . . , N) may include a list of applications running on the node, a log of connection sessions and types of connections to and from other nodes, an Internet address or a range of Internet addresses of the node, geodata of the node and geodata of other nodes connected to the node, a type and a version of an operational system running on the node, a type and a version of an Internet browser running on the workload, a type and a version of an antivirus application running on the node, and so forth. In example embodiments, the metadata may include a business function of the workload, regulatory requirements associated with the workload, recovery objectives, cyber security context, known process, vulnerability over a predetermined threshold, given location, predetermined business context, database, file store, time when the relationship first occurred, domain, change in a relationship commencing at a specific time/date, and so forth. In an example embodiment, the workloads may include bare metal servers, cloud service instances, containers, group of containers such as Kubernetes pods or PaaS pods, mobile devices, Internet-of-Things devices, users, client devices, processes, middleware objects, such as message queues, user identifiers, and so forth.

Based on the metadata, the relationship-based search system 120 can determine whether the node has one or more vulnerabilities allowing hacker attacks and infection by computer viruses and malicious software. An indication that the node has a vulnerability may include an absence of an antivirus running on the node, an indication that the antivirus running on the node is obsolete, metadata ingested from a vulnerability scanning system that reports upon the vulnerabilities of a node, an indication that the node allows unsecure network connections, and so forth.

The relationship-based search system 120 can be configured to receive a user query. The user query can be provided in a natural human language. The user query may include a query based on context of the metadata. The user query may include, for example, a name of a specific application running on the nodes, a type of application running on the nodes, a specific node, a range of geodata associated with nodes, a type of a connection (secure or unsecure) between the nodes, a number of connections between the nodes needed to travel from a node to another node, metadata about a node's business purpose or regulatory significance, processing realm, business owner, classification, regulatory classification, data classification, operational classification, metadata associated with a business purpose or regulatory significance of the workload, and so forth. In an example embodiment, the controller 400 may receive the metadata from a plurality of sources 150 of metadata. For example, the metadata may be determined automatically using application programming interface (API) connectors to sources 150 of metadata, such as third-party authoritative sources (such as a security scanner for vulnerabilities, a Governance, Risk and Compliance (GRC) tool, and so forth).

Examples of the user query may include "show me all client connections to my database not having antivirus," "show me all nodes that can be indirectly connected to my database and allowing unsecure connection," "show me all nodes in China running my application and having relationship to systems with vulnerabilities of a severity of Medium or higher," and so forth. In an example embodiment, a namespace of the user query may have the form of "from, to, relationship."

In response to the user query, the relationship-based search system 120 may determine, using metadata associated with the nodes, a subset of the nodes in graph database 425 and a subset of relationships between the nodes in the subset of the nodes that satisfy the user query. The relationship-based search system 120 can further display, via a graphical user interface, the results of the search, which include nodes (e.g., workloads, users, and applications) from the subset of the nodes and edges (relationships) between the nodes in the subset of the nodes. The relationship-based search system 120 can be configured to receive a further user query narrowing the search parameters and perform the search on the subset of the nodes or be applied to the results of the first query.

In some embodiments, the relationship-based search system 120 can be implemented as part of the controller 400. The relationship-based search system 120 can generate a security policy based on the search results. The search results include a subset of the nodes and the subset of relationships. The security policy may disallow or allow at least one relationship between the nodes corresponding to the nodes in the graph database 425. Allowance or disallowance of the at least one relationship may be based on whitelists and blacklists. The controller 400 may apply the security policy in the computing environment 100.

Figure 2:
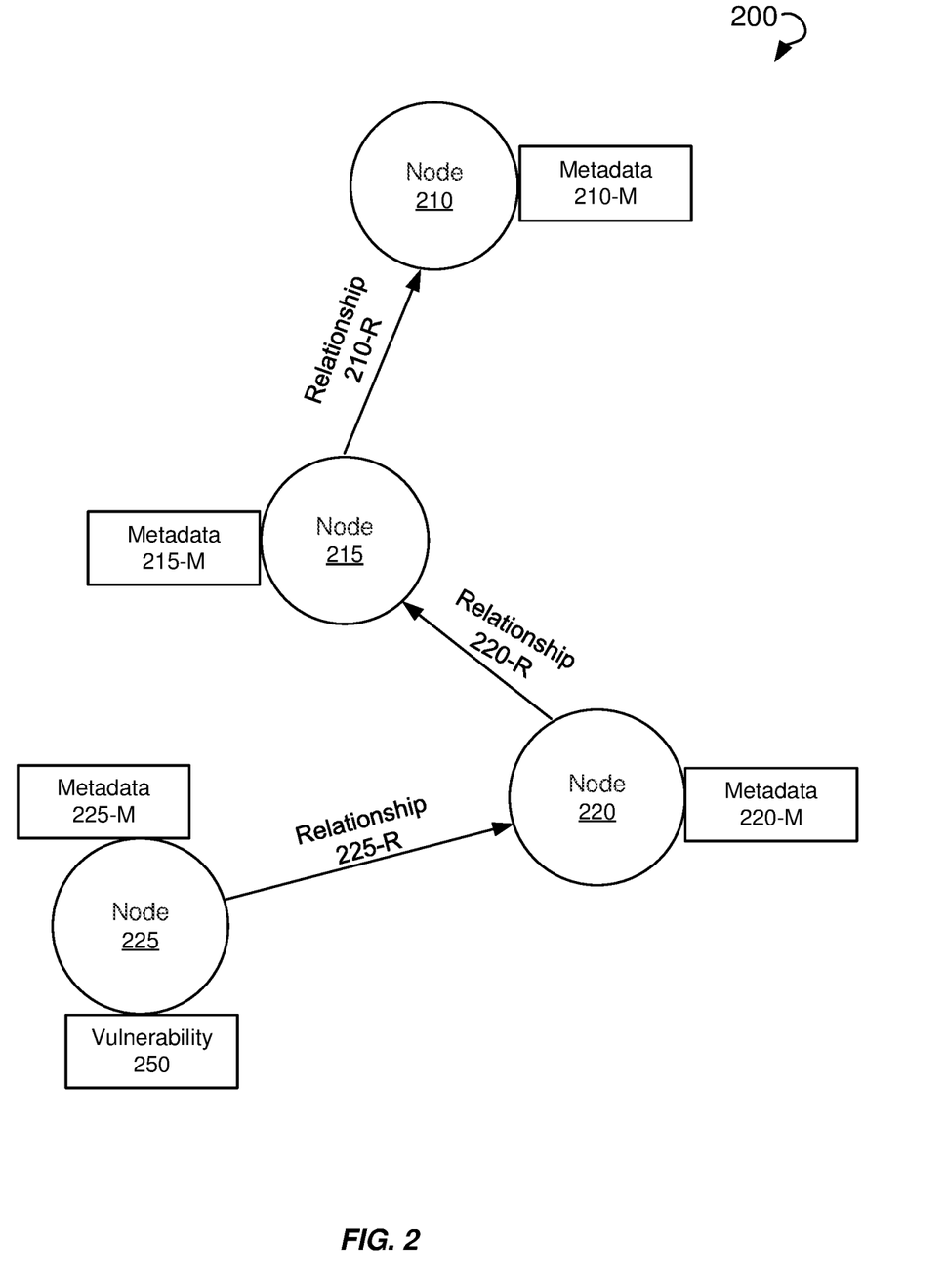
FIG. 2 shows an example subset of nodes and relationships in a graph database, according to an example embodiment.

FIG. 2 shows an example subset 200 of nodes and relationships in a graph database 425, according to an example embodiment. The subset 200 may include nodes denoted as nodes 210, 215, 220, and 225. The edges in subset 200 connect the nodes having relationships 210-R, 220-R, and 225-R. The nodes 210, 215, 220, and 225 include metadata 210-M, 215-M, 220-M, and 225-M, respectively. It should be noted that the relationships 210-R, 220-R, and 230-R can refer to different applications running on the nodes 210, 215, 220, and 225. For example, the node 225 may use a database A installed on the node 220, the node 220 may use a database B installed on the node 215, and the node 215 may use a database C installed on the node 210. The databases A, B, and C can be distinct and associated with different applications.

The subset 200 may be a result of a search performed by the relationship-based search system 120 in response to a user query. The user query may include a request to search for a chain of nodes that can be used to obtain unauthorized access to the node 210. The relationship-based search system 120 can determine, based on the metadata 210-M, 220-M, 230-M, and 240-M, that the node 225 has a vulnerability 250. For example, the node 225 may allow unsecure connections from other nodes (not shown in the FIG. 2), may have applications installed with known vulnerabilities, or may have an obsolete version of a critical security software agent, or the node 225 may not have a critical security software agent installed on it. The result of the search may provide a user, for example an administrator of the node 210, with information concerning possible vulnerability of node 210 due to vulnerability 250 of the node 225 because there is a path from the node 225 to the node 210 via the relationships 225-R, 220-R, and 225-R.

Figure 3:
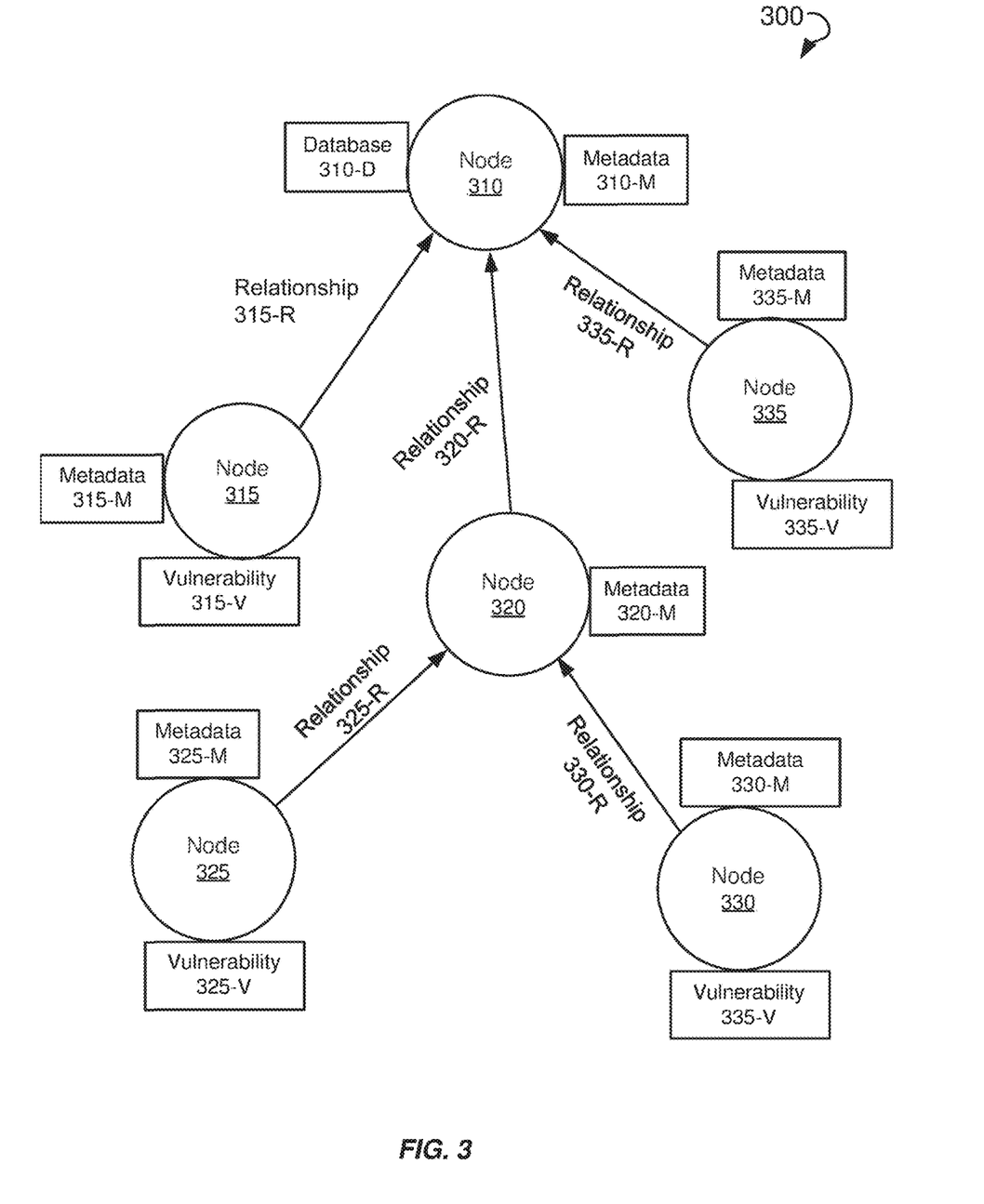
FIG. 3 shows an example subset of nodes and relationships in a graph database, according to another example embodiment.

FIG. 3 shows an example subset 300 of nodes and relationships in a graph database 425, according to another example embodiment. The subset 300 may include nodes denoted as nodes 310, 315, 320, 325, 330, and 335. The edges in subset 300 connect the nodes having relationships 315-R, 320-R, 325-R, 330-R, and 335-R. The nodes 310, 315, 320, 325, 330, and 335 have metadata 310-M, 315-M, 320-M, 325-M, 330-M, and 335-M, respectively. The node 310 may include a database 310-D.

The subset 300 may be a result of the search performed by the relationship-based search system 120 in response to a user query. The user query may include a query for nodes that run a specific application reading the database 310-D on the node 310 and which have some vulnerabilities. The relationship-based search system 120 can determine, based on the metadata 310-M, 315-M, 320-M, 325-M, 330-M, and 335-M, that the nodes 315, 325, 330, and 335 run applications requiring access to the database 310-D. The nodes 315, 325, 330, and 335 have vulnerabilities 315-V, 325-V, 330-V, and 335-V, respectively. The vulnerabilities 315-V, 325-V, 330-V, and 335-V can be of different types, such as an absence of an antivirus on the node, an indication that the node runs an obsolete version of an operational system or an obsolete version of a critical system application, an indication that the node allows unsecure connections, and so forth. The result of a search may indicate that vulnerable nodes 315 and 335 connect to the database 310-D directly and vulnerable nodes 325 and 330 may connect to the database 310-D indirectly via the node 320. An administrator of the database 310-D may request that the relationship-based search system 120 generate a security policy prohibiting connections to the node 310 from the vulnerable nodes 315, 325, 330, and 335.

Figure 4:
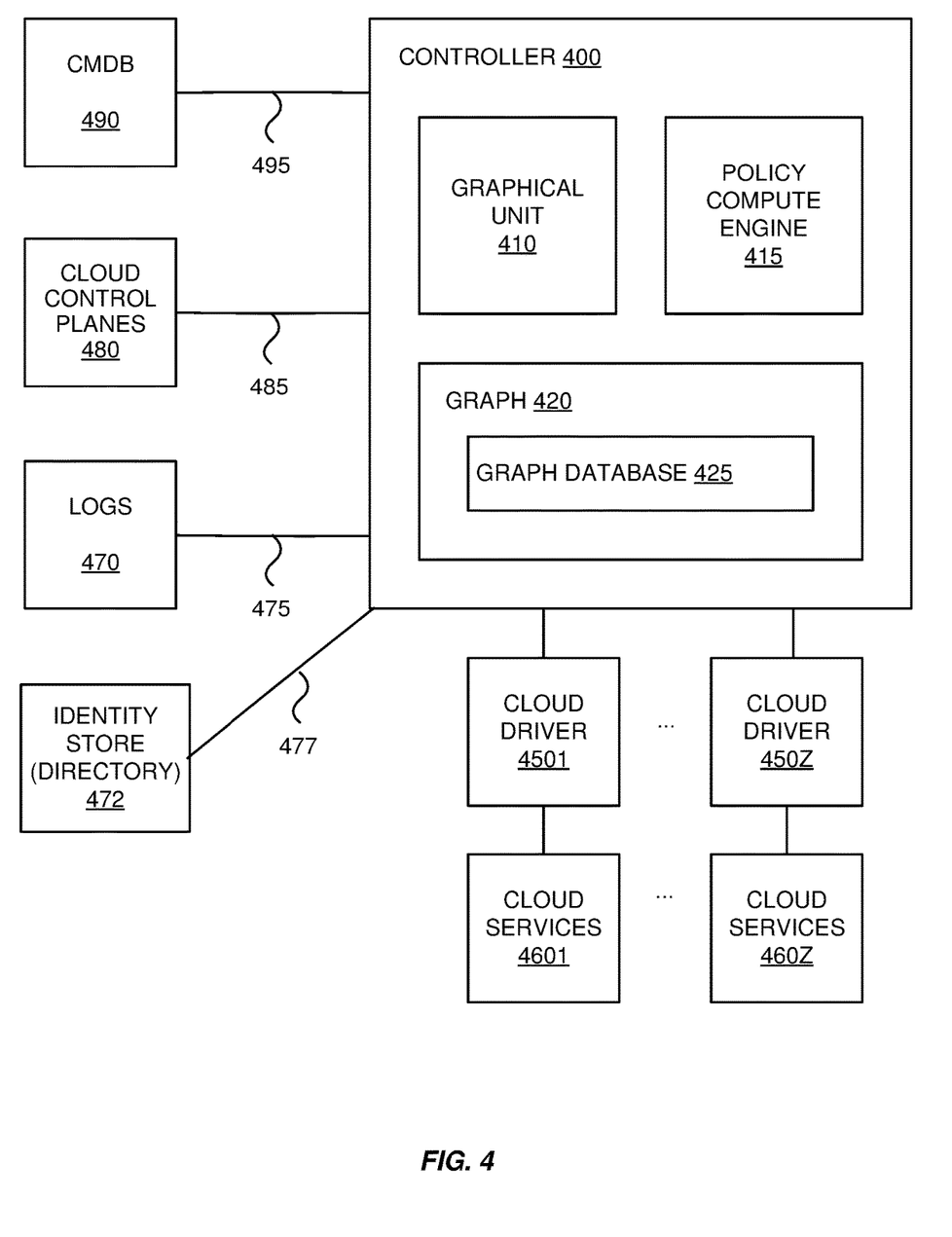
FIG. 4 shows a controller associated with a system for a relationship-based search in a computing environment, according to an example embodiment.

FIG. 4 shows a controller 400, according to an example embodiment. The controller 400 can receive streaming telemetry 475 from network logs 470, events 485 from cloud control plane 480, inventory 495 from configuration management database (CMDB) 490, and metadata from authoritative sources within the environment (such as a security scanner for vulnerabilities, a GRC tool for recovery time requirements and regulatory status and obligations associated with a node, or a directory services for organizational and role membership of users).

Network logs 470 can be data sources such as flow logs from cloud services 4601-460Z (e.g., Amazon Web Services (AWS), Microsoft Azure, and Google Cloud Platform (GCP)), vArmour DSS Distributed Security System, Software Defined Networking (SDN) (e.g., VMware NSX and Cisco Application Centric Infrastructure (ACI)), monitoring agents (e.g., Tanium Asset and Falco), and the like. Generally, streaming telemetry 475 can be low-level data about relationships between applications. Streaming telemetry 475 can include 5-tuple, layer 7 (application layer) process information, management plane logs, and the like. 5-tuple refers to a set of five different values that comprise a TCP/IP connection: a source IP address/port number, destination IP address/port number, and the protocol in use. Streaming telemetry 475 can alternatively or additionally include a volume of data (i.e., how much data there is or how many data packets there are) exchanged between nodes (e.g., a physical computing system, a virtual machine, a container, and combinations thereof) in a network, dates and times at which communications (e.g., data packets) are exchanged between nodes, and the like.

Cloud control plane 480 establishes and controls the network and computing resources within a computing environment (e.g., computing environment 100 in FIG. 1). Cloud control plane 480 can include interfaces for managing assets (e.g., launching virtual machines and/or containers, configuring the network, etc.) in a computing environment. For example, cloud control plane 480 can include one or more instances of container orchestration, such as Docker Swarm®, Kubernetes®, Amazon EC2 Container Service (ECS), Diego, and Apache® Mesos™. By way of further non-limiting examples, cloud control plane 480 can include VMware vSphere, APIs provided by cloud services 4601-460Z, and the like.

Events 485 can include information about a container being created, having a state change, having an error, and the like. For example, when a container is created, information about the node such as a service name, image deployed, and the like can be received in events 485. By way of further example, additional information from an image registry corresponding to the deployed image can be gathered by controller 400.

The CMDB 490 can be a database of information about the hardware and software components (also known as assets) used in a computing environment (e.g., the computing environment 100 in FIG. 1) and relationships between those components and business functions. CMDB 490 can include information about upstream sources or dependencies of components and the downstream targets of components. For example, inventory 495 can be used to associate an application name and other information (e.g., regulatory requirements, business unit ownership, business criticality, and the like) with the node it is running on.

In an example embodiment, the metadata associated with users may include identity of the users. For the purposes of identity, an identity store (directory) 472 (such as Lightweight Directory Access Protocol (LDAP)) may be utilized to provide metadata associated with the organizational membership of a user, including organizational unit membership, roles, groups, and permissions and administrative status.

Streaming identity 477, telemetry 475, events 485, and inventory 495 can be ingested by graph 420. Graph 420 normalizes information received in streaming telemetry 475, events 485, and inventory 495 into a standard data format and/or model stored in a graph database 425. Graph database 425 uses a graph data model comprised of nodes (also referred to as vertices), which are entities such as users, applications, or workloads, and edges, which represent the relationship between two nodes. Edges can be referred to as relationships. An edge can have a start node, end node, type, and direction, and an edge can describe parent-child relationships, actions, ownership, and the like. In contrast to relational databases, relationships are (most) important in graph database 425. In other words, connected data is equally (or more) important than individual data points.

Conventionally, security management systems store raw logs of each and every individual communication between nodes. The amount of data is scaled linearly and consumes massive amounts of storage. In contrast, streaming telemetry 475, events 485, and inventory 495 can be used by graph 420 to create and update graph database 425. The individual communications may be not stored. In this way, graph database 425 is advantageously scalable. For example, a graph database 425 for large computing environments of 30,000-50,000 nodes can be stored in a memory of a node.

A graphical unit 410 can visually present information from graph database 425 to users according to various criteria, such as by application, application type, organization, and the like. The graphical unit 410 can visually organize information from graph database 425. In some embodiments, nodes that behave similarly can be clustered together (i.e., be put in a cluster). For example, when two nodes have similar edges (relationships) and behave in a similar fashion (e.g., run the same application, are associated with the same organization, and the like), the two nodes can be clustered together. Nodes that are clustered together can be visually presented as a shape (e.g., circle, rectangle, and the like), which denotes that there are a certain number of nodes fulfilling the same function, instead of presenting a shape for each node in the cluster.

The policy compute engine 415 can use information in the graph database 425 to design security policies, also referred to herein as policies. The policy compute engine 415 can produce multiple security policies, each reflecting independent pieces of security logic that can be implemented by the policy compute engine 415. Security policies can implement security controls, for example, to protect an application wherever it is in a computing environment (e.g., the computing environment 100 in FIG. 1). A security policy can specify what is to be protected ("nouns") (for example, applications run for a particular organization). A security policy can further specify a security intent ("verbs"), that is, how to protect. For example, a security intent can be to implement Payment Card Industry Data Security Standard (PCI DSS) network segmentation requirements (a regulatory requirement), implement security best practices for databases, implement a whitelist architecture, and the like. By way of further example, a security intent can be specified in a template by a user (responsible for system administration, security, and the like).

Cloud drivers 4501-450Z can serve as an interface between the policy compute engine 415 (having a centralized security policy) and cloud services 4601-460Z. In other words, cloud drivers 4501-450Z implement the security policy using different facilities (e.g., APIs) and capabilities available from cloud services 4601-460Z.

Figure 5:
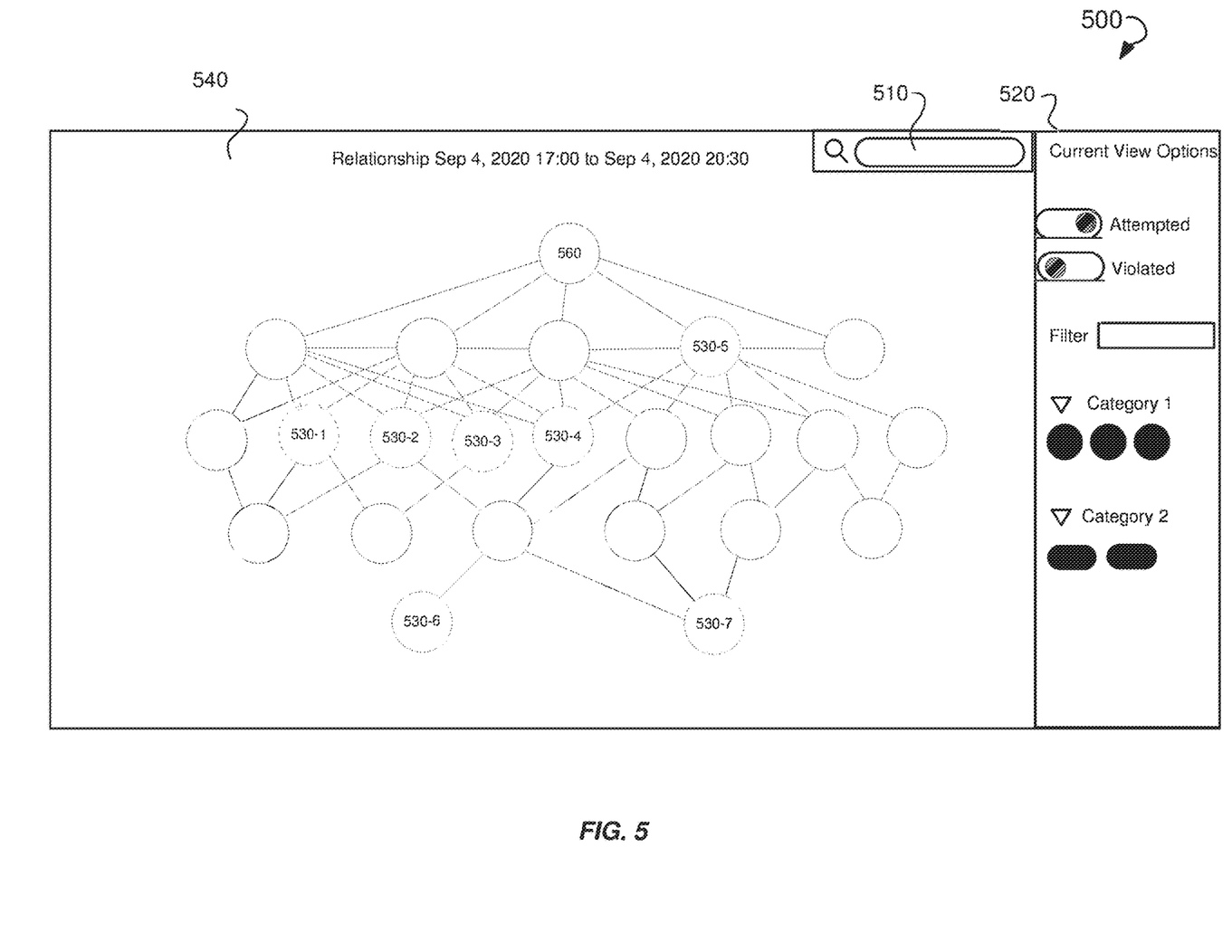
FIG. 5 shows an example screen of graphical user interface showing nodes and relationships between the nodes of a relationship-based search system, according to an example embodiment.

FIG. 5 shows an example screen 500 of a graphical user interface showing nodes and relationships between the nodes of a relationship-based search system 120, according to an example embodiment. The screen 500 may include an entry field 510 for entering a user query, a current view options panel 520, and a graphical representation 540 of a subset of nodes and edges determined in response to the user query. The graphical representation may highlight nodes (e.g., workloads) having vulnerabilities. In the example of FIG. 1, the nodes 530-1, 530-2, 530-3, and 530-4 may have vulnerabilities of a first type, the nodes 530-6 and 530-7 may have vulnerabilities of a second type, and the node 530-5 may have a vulnerability of a third type. All of these nodes can be used by a potential attacker to get access to a node 560.

Figure 6:
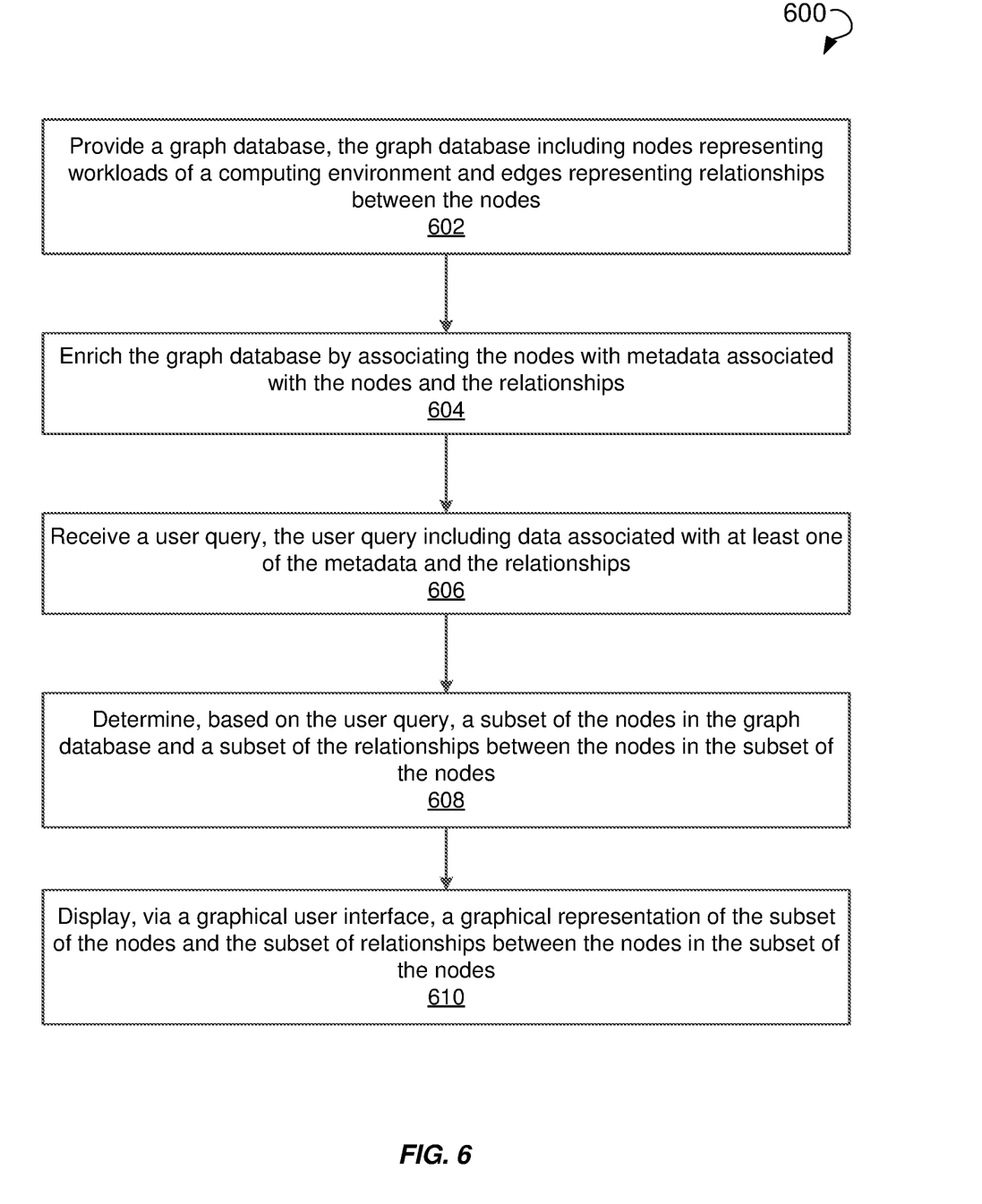
FIG. 6 is a flow chart showing a method for a relationship-based search in a computing environment, according to an example embodiment.

FIG. 6 is a flow chart of a method 600 for a relationship-based search in a computing environment. The method 600 can be performed by the controller 400 and the relationship-based search system 120 in the computing environment 100 of FIG. 1.

The method 600 may commence in block 602 with providing a graph database. The graph database may include nodes representing at least workloads of the computing environment and edges representing relationships between the nodes.

In block 604, the method 600 may include enriching the graph database by associating the nodes with metadata associated with the nodes and metadata associated with the relationships. For each of the nodes, the metadata may include a list of applications running on a node, a log of connection sessions and type of connections to other nodes, an Internet address or a range of Internet addresses of the node, geodata of the node and geodata of other nodes connected to the node, a type and a version of an operational system running on the node, a type and a version of an Internet browser running on the node, a type and a version of an antivirus application running on the node, and so forth.

In block 606, the method 600 may proceed with receiving a user query. The user query may include data associated with at least one of the metadata and the relationships. The user query includes a range of geodata associated with one or more nodes, a type of an application running on the nodes, a type of connection between the nodes, a specific node in the computing environment, and so forth. The user query can be provided in a natural human language.

In block 608, the method 600 may include determining, based on the user query, a subset of the nodes in the graph database and a subset of relationships between the nodes in the subset of the nodes. Determining the subset of the nodes may include determining nodes corresponding to nodes running an application specified in the user query. Determining the subset of the nodes may include determining nodes corresponding to nodes not running an application specified in the user query. The application specified in the user query may include an antivirus application. In a further example embodiment, determination of the subset of the nodes may include determining at least one of users, roles, and organizations corresponding to the relationships associated with nodes running an application specified in the user query.

Determining the subset of the nodes may include determining a chain of consecutively connected nodes. A first node in the chain may be unauthorizedly accessible from the last node in the chain via middle nodes in the chain.

Determining the subset of the nodes may include determining a chain of consecutively connected nodes. The last node in the chain may have a vulnerability and is connected to the first node in the chain via a predetermined number of nodes. The predetermined number may be specified in the user query. In an example embodiment, nodes within the chain that meets a predetermined condition may have an indirect relationship, e.g., a relationship between a system processing personally identifiable information (PII) and a system with connectivity to the Internet.

Determining the subset of the nodes may include determining nodes corresponding to nodes running an application specified in the user query and having at least one vulnerability.

In block 610, the method 600 may display, via a graphical user interface, a graphical representation of the subset of the nodes and relationships between the nodes in the subset of the nodes. In optional block 612, the method 600 may proceed with generating, based on the subset of the nodes and the subset of relationships, a security policy disallowing at least one relationship between the nodes corresponding to the nodes in the graph database.

Figure 7:
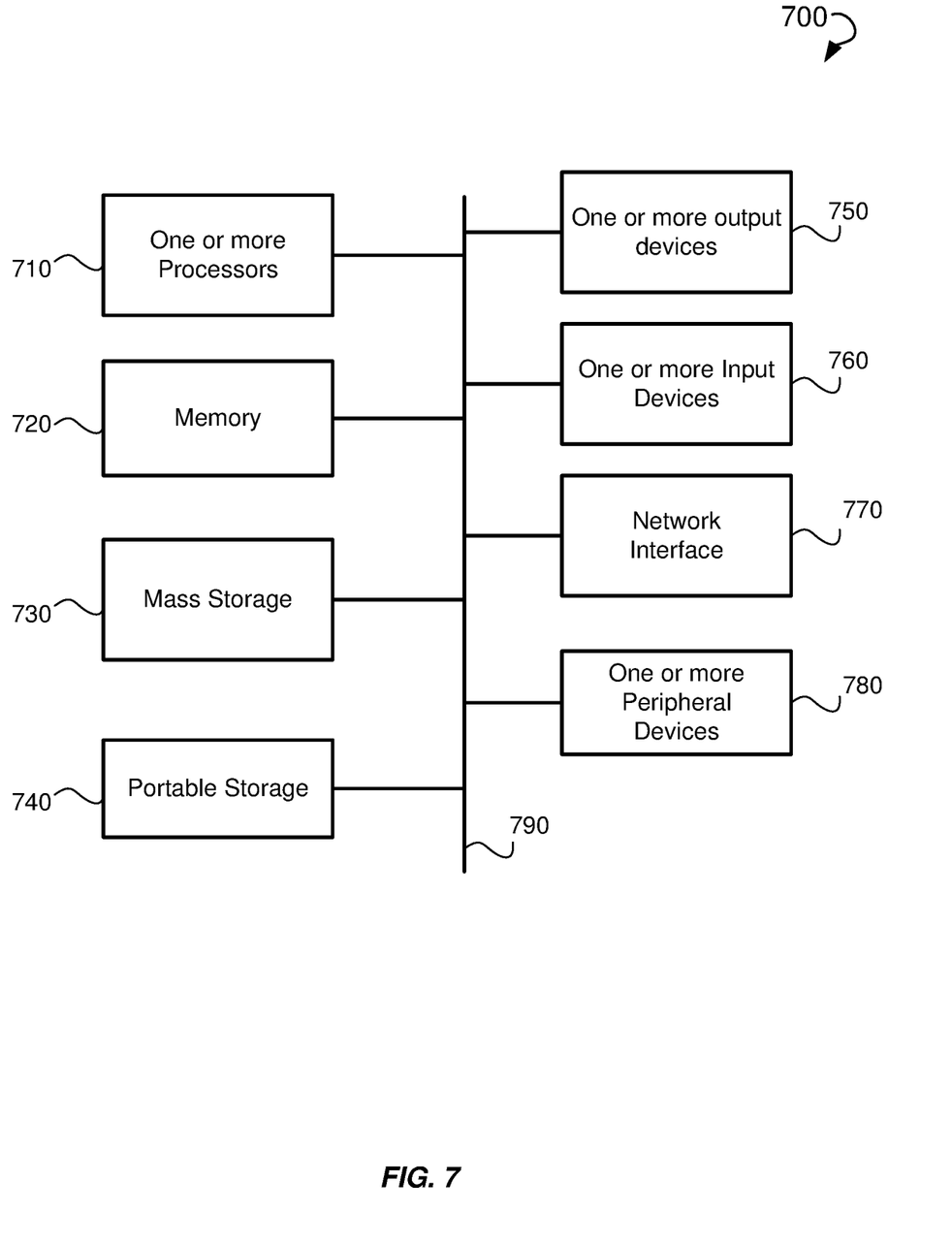
FIG. 7 shows a computing system that can be used to implement a system and a method for a relationship-based search in a computing environment, according to an example embodiment.

FIG. 7 illustrates an exemplary computing system 700 that may be used to implement embodiments described herein. The computing system 700 can be implemented in the contexts of the nodes 110-$i$ ($i=1, \ldots, N$), relationship-based search system 120, the graph database 425, and the controller 400. The exemplary computing system 700 of FIG. 7 may include one or more processors 710 and memory 720. Memory 720 may store, in part, instructions and data for execution by the one or more processors 710. Memory 720 can store the executable code when the exemplary computing system 700 is in operation. The exemplary computing system 700 of FIG. 7 may further include a mass storage 730, portable storage 740, one or more output devices 750, one or more input devices 760, a network interface 770, and one or more peripheral devices 780.

The components shown in FIG. 7 are depicted as being connected via a single bus 790. The components may be connected through one or more data transport means. The one or more processors 710 and memory 720 may be connected via a local microprocessor bus, and the mass storage 730, one or more peripheral devices 780, portable storage 740, and network interface 770 may be connected via one or more input/output buses.

Mass storage 730, which may be implemented with a magnetic disk drive or an optical disk drive, is a non-volatile storage device for storing data and instructions for use by a magnetic disk or an optical disk drive, which in turn may be used by one or more processors 710. Mass storage 730 can store the system software for implementing embodiments described herein for purposes of loading that software into memory 720.

Portable storage 740 may operate in conjunction with a portable non-volatile storage medium, such as a compact disk (CD) or digital video disc (DVD), to input and output data and code to and from the computing system 700 of FIG. 7. The system software for implementing embodiments described herein may be stored on such a portable medium and input to the computing system 700 via the portable storage 740.

One or more input devices 760 provide a portion of a user interface. The one or more input devices 760 may include an alphanumeric keypad, such as a keyboard, for inputting alphanumeric and other information, or a pointing device, such as a mouse, a trackball, a stylus, or cursor direction keys. Additionally, the computing system 700 as shown in FIG. 7 includes one or more output devices 750. Suitable one or more output devices 750 include speakers, printers, network interfaces, and monitors.

Network interface 770 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 770 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 780 may include any type of computer support device to add additional functionality to the computing system. The one or more peripheral devices 780 may include a modem or a router.

The components contained in the exemplary computing system 700 of FIG. 7 are those typically found in computing systems that may be suitable for use with embodiments described herein and are intended to represent a broad category of such computer components that are well known in the art. Thus, the exemplary computing system 700 of FIG. 7 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accordance with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for a relationship-based search in a computing environment are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for a relationship-based search in a computing environment, the system comprising:
   at least one processor; and
   a memory communicatively coupled to the at least one processor, the memory storing instructions executable by the at least one processor to perform a method comprising:
      providing a graph database, the graph database including nodes representing at least workloads of the computing environment and edges representing relationships between the nodes;
      enriching the graph database by associating the nodes with metadata associated with the nodes and the relationships;
      receiving a user query, the user query including data associated with at least one of the metadata and the relationships;
      determining, based on the user query, a subset of the nodes in the graph database and a subset of the relationships between the nodes in the subset of the nodes;
      generating, based on the subset of the nodes and the subset of the relationships, a security policy allowing at least one of the relationships between the workloads corresponding to the nodes in the graph database; and
      displaying, via a graphical user interface, a graphical representation of the subset of the nodes and the subset of the relationships between the nodes in the subset of the nodes.

2. The system of claim 1, wherein the determining the subset of the nodes includes determining nodes running an application specified in the user query.

3. The system of claim 1, wherein the determining the subset of the nodes includes determining at least one of users, roles, and organizations corresponding to relationships associated with nodes running an application specified in the user query.

4. The system of claim 1, wherein the determining the subset of the nodes includes determining nodes corresponding to workloads not running an application specified in the user query.

5. The system of claim 1, wherein the metadata are associated with at least one of the following: a known process, a vulnerability over a predetermined threshold, a given location, a predetermined business context, a database, and a file store.

6. The system of claim 1, wherein the at least one processor is configured to generate, based on the subset of the nodes and the subset of the relationships, a security policy disallowing at least one relationship between the nodes corresponding to the nodes in the graph database.

7. The system of claim 1, wherein the determining the subset of the nodes includes determining a chain of consecutively connected nodes, wherein a first node in the chain is unauthorizedly accessible from a last node in the chain via middle nodes in the chain.

8. The system of claim 1, wherein the determining the subset of the nodes includes determining a chain of consecutively connected nodes, wherein nodes within the chain that meet a predetermined condition have an indirect relationship.

9. The system of claim 1, wherein the determining the subset of the nodes includes determining a chain of consecutively connected nodes, wherein a last node in the chain has a vulnerability and is connected to the first node in the chain via a predetermined number of nodes, the predetermined number being specified in the user query.

10. The system of claim 1, wherein the determining the subset of the nodes includes determining nodes corresponding to workloads running an application specified in the user query and having at least one vulnerability.

11. The system of claim 1, wherein the determining the subset of the nodes includes determining nodes corresponding to nodes connected to a workload specified in the user query and having at least one vulnerability.

12. The system of claim 1, wherein the user query includes a query based on a context of the metadata.

13. The system of claim 1, wherein the user query is provided in a natural human language.

14. A method for a relationship-based search in a computing environment, the method comprising:
   providing a graph database, the graph database including nodes representing at least workloads of the computing environment and edges representing relationships between the nodes;
   enriching the graph database by associating the nodes with metadata associated with the nodes and the relationships;
   receiving a user query, the user query including data associated with at least one of the metadata and the relationships;
   determining, based on the user query, a subset of the nodes in the graph database and a subset of the relationships between the nodes in the subset of the nodes;
   generating, based on the subset of the nodes and the subset of the relationships, a security policy disallowing at least one of the relationships between the nodes corresponding to the nodes in the graph database; and
   displaying, via a graphical user interface, a graphical representation of the subset of the nodes and the subset of the relationships between the nodes in the subset of the nodes.

15. The method of claim 14, wherein the determining the subset of the nodes includes determining nodes running an application specified in the user query.

16. The method of claim 14, wherein the determining the subset of the nodes includes determining nodes not running an application specified in the user query.

17. The method of claim 14, wherein the determining the subset of the nodes includes determining a chain of consecutively connected nodes, wherein a first node in the chain is unauthorizedly accessible from a last node in the chain via middle nodes in the chain.

18. A non-transitory processor-readable medium having embodied thereon a program being executable by at least one processor to perform a method for a relationship-based search in a computing environment, the method comprising:
   providing a graph database, the graph database including nodes representing at least workloads of the computing environment and edges representing relationships between the nodes;
   enriching the graph database by associating the nodes with metadata associated with the nodes and the relationships;
   receiving a user query, the user query including data associated with at least one of the metadata and the relationships;
   determining, based on the user query, a subset of the nodes in the graph database and a subset of the relationships between the nodes in the subset of the nodes;
   generating, based on the subset of the nodes and the subset of the relationships, a security policy disallowing at least one of the relationships between the nodes corresponding to the nodes in the graph database; and displaying, via a graphical user interface, a graphical representation of the subset of the nodes and the subset of the relationships between the nodes in the subset of the nodes.

\* \* \* \* \*